United States Patent [19]

Rinfret

[11] 4,131,200
[45] Dec. 26, 1978

[54] THERMOPLASTIC BLOOD BAG

[75] Inventor: Arthur P. Rinfret, New York, N.Y.

[73] Assignee: Union Carbide Corporation, New York, N.Y.

[21] Appl. No.: 702,421

[22] Filed: Jul. 6, 1976

[51] Int. Cl.² .................. B65D 33/16; B65D 81/00; B65D 85/50
[52] U.S. Cl. .................. 206/484; 128/214 D; 128/DIG. 24; 150/8; 206/524.2; 206/526; 206/633
[58] Field of Search .............. 62/60; 128/214 D, 272, 128/DIG. 24; 150/1, 8; 206/484, 524.2, 526, 632–633; 229/3.5 MF, 62

[56] References Cited

U.S. PATENT DOCUMENTS

| 2,894,510 | 7/1959 | Bellamy, Jr. | 128/272 |
| 3,058,799 | 10/1962 | Rowles, Jr. | 128/214 D X |
| 3,211,144 | 10/1965 | Nehring | 150/1 X |
| 3,545,671 | 12/1970 | Ross | 128/214 D X |
| 3,576,650 | 4/1971 | Underwood et al. | 206/526 |
| 3,770,122 | 11/1973 | Thiele | 206/484 |
| 3,788,374 | 1/1974 | Saijo | 150/1 |
| 3,942,529 | 3/1976 | Waage | 206/526 X |

Primary Examiner—Steven E. Lipman
Attorney, Agent, or Firm—Harrie M. Humphreys

[57] ABSTRACT

A thermoplastic bag is formed of laminate edge walls enclosing a fluid storage compartment for holding biologically active material such as blood platelets, and first and second access passageways each with first outer and second inner unfused transverse seals.

14 Claims, 7 Drawing Figures

THERMOPLASTIC BLOOD BAG

BACKGROUND OF THE INVENTION

This invention relates to a thermoplastic bag useful for storage of isolated materials including living cells such as blood platelets, and a method for long-term storage and utilization of such living cells including the introduction of same in the bag, insitu freezing and storage at cryogenic temperatures, and thawing and discharge from the bag when needed.

Living cells such as blood platelets are presently stored in the frozen form in single layer bags fabricated from a flexible plastic material as for example polyethylene. The bags are fitted with tubular inserts as access openings which are heat-sealed in position as ports. Heat seals are applied to the top and bottom of the bags to effect bag closure. This commercially employed bag is sterilized by ethylene oxide which unfortunately renders it unsuitable for use as a container for the cryoprotectant solutions into which the cells must be placed prior to low temperature processing. This limitation requires the blood banker to procure his own solutions and transfer the volume needed to the bag. Accordingly, it is not possible to provide a sterilized cryoprotectant-filled bag which would be useful as a blood bag under standardized procedures for handling.

Other disadvantage of the aforedescribed blood storage bag formed from a single layer of plastic film is that the same tends to be fragile at cryogenic temperatures. This is inherent in any single layer material. Whereas breakage of a bag containing whole blood or red blood cells may be a tolerable economic loss (assuming replacement blood of the same type is available), such breakage and product loss is unacceptable in the case of valuable living cell material more difficult to obtain and process such as blood platelets.

Another disadvantage of prior art living cell storage bags is that they require additional manufacturing steps to add tubular inserts through access openings, and thereafter heat seal the inserts in position as ports. These are time consuming and expensive steps, and the resulting product is three dimensional in shape even when empty, hence inconvenient for storage.

An object of this invention is to provide an improved bag useful for storage of isolated materials. Another object of this invention is to provide an improved bag useful for storage of living cells which is heat sterilizable, structurally stable at temperature as low as $-196°$ C. and also at elevated temperature suitable for sterilization such as above 127° C.

Another object is to provide an improved bag which does not require separate tubular inserts for access ports, and which is flat and two dimensional prior to filling.

Still another object is to provide a package comprising a thermoplastic bag containing cryoprotectant solution which can be heat sterilized insitu.

A further object of this invention is to provide an improved method for long-term storage of living cells by introduction in a thermoplastic bag, freezing and storage, thawing and discharge when needed.

Other objects and advantages of the invention will be apparent for the ensuing disclosure and appended claims.

SUMMARY

This invention relates to a thermoplastic bag useful for storage of isolated materials including living cells and a method for long-term storage and utilization of such living cells including the freezing of same in the aforementioned bag.

According to the invention there is provided a sealed, flexible thermoplastic bag comprising: a fluid storage compartment enclosed by laminate edge seal sections, with the first and second passageways each having an outer end joining walls integral with and extending through an edge seal with inner ends in fluid communication with said fluid storage compartment. First separably adhering unfused seal means are located transverse the outer ends of each said first and second passageways and pull-tab means are positioned over each of said first separably adhering seal means and associated therewith so as to open same on separation.

Second separably adhering unfused heat seal means are provided transverse each of the first and second passageways and intermediate the inner and outer ends. The fluid storage compartment and first and second passageways are each substantially flat and two dimensional prior to liquid filling but deformable to three dimensional configuration. They are formed by a laminate having at least two layers. If the bag is to be used for storage of living cells to be frozen, the laminate is heat sterilizable and structurally stable at temperature as low as $-196°$ C. The innermost layer is heat fusible to itself, for living cell storage at temperature above 127° C., such that said edge seal sections comprise fused oppositely facing innermost layers with two unfused transversely spaced longitudinal sections each entirely transversely surrounded by the fused innermost layer. The unfused spaced sections are adaptable for outward transversely diverging displacement of said innermost layers by external longitudinal penetration through the outer end so as to form said first and second access passageways.

This invention also includes a package having the aforedescribed fluid storage compartment, surrounding laminate edge seal sections, first and second access passageways, first separably adhering unfused seal means transverse to the outer end of the second passageway and pull-tab means thereover and associated with the first seal means so as to open same on separation. The package also includes the aforedescribed second seal means transverse to the second passageway intermediate the inner and outer ends thereof, and third permanently fused heat seal means transverse to the first access passageway intermediate its inner and outer ends. The package is formed by the laminate as previously described in connection with the thermoplastic bag, and biologically active material is stored within the compartment and enclosed by the innermost layer of the laminate.

The invention also provides a method for long term storage and utilization of biologically active material as for example enzymes, antibodies, or living cells suspended in cryoprotectant solution, using the aforedescribed bag. The pull-tab means and first seal means are aseptically separated from the first passageway outer end, and biologically active material charging means are aseptically inserted therein. The adjacent innermost layers forming the unfused section of the edge seal part are outwardly transversely displaced from each other and the second separably adhering unfused seal means is penetrated by the charging means inner tip. Biologically active material is then delivered through the charging means into the bag. Next the charging means is partially withdrawn from the first passageway such that the inner tip is positioned between the innermost penetration and the first passageway outer end. The first passageway is then transversely fusion heat sealed to form third seal means between the partially withdrawn inner tip and the first passageway inner end, and the charging means is removed from the first passageway.

The biologically active material is frozen within the bag, stored in the frozen condition and then thawed within the bag when needed. The pull tab means and first separably adhering unfused seal means over the second passageway outer end of the thawed biologically active material-containing bag are aseptically separated, and biologically active material withdrawal means aseptically inserted into the second passageway outer end. The adjacent innermost layers forming the unfused section of the edge seal part in the second passageway are outwardly transversely displaced from each other and the second separably adhering unfused seal means is penetrated by the withdrawal means inner tip. The bag is inverted and the thawed biologically active material is removed through the withdrawal means.

DESCRIPTION OF THE PREFERRED EMBODIMENTS

Figure 1:
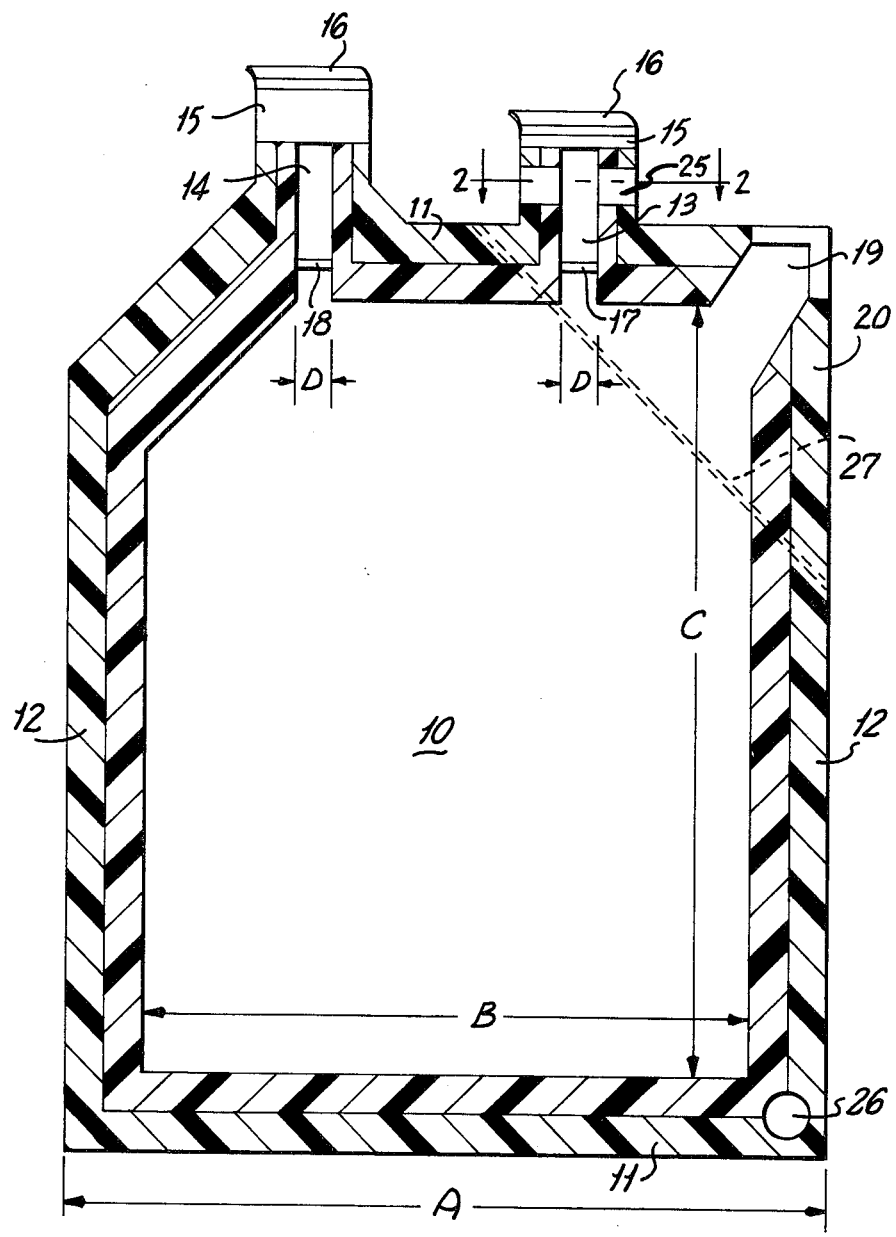
FIG. 1 is an elevation view taken in cross section of a thermoplastic bag of the invention.

Referring now to the drawings, the FIG. 1 bag comprises fluid storage compartment 10 with end edge seal sections 11 and side edge seal sections 12 surrounding the compartment. The walls of compartment 10 are formed by a laminate having at least two layers and is heat sterilizable for storage of certain materials and structurally stable at temperature as low as −196° C. when fluids are to be frozen in situ as for example at liquid nitrogen temperature. The innermost layer is heat fusible to itself, and for storage of certain materials sterilizable at temperatures above 127° C. First and second passageways 13 and 14 respectively have walls integral with and extending through an end edge seal 11. Each such passageway has an inner end 13a or 14a in fluid communication with fluid storage compartment 10 and outer ends 13b or 14b. Separably adhering unfused seal means 15 are transverse to each of the first and second access passageway outer ends 13b and 14b.

Seal means 15 are preferably formed by heat, but below the laminate inner layer fusion temperature. Pull-tab means 16 are positioned over each of separably adhering seal means 15 and associated therewith so as to open same on separation. Although illustrated in FIG. 1 as extending into an outward projection of end edge seal 11, passageway outer ends 13b and 14b may terminate in a flat end with only seal means 15 and pull tab means 16 extending outwardly or even coterminous with the flat end.

Second separably adhering unfused heat seal means 17 is transverse to first access passageway 13 intermediate the inner and outer ends thereof. In like manner, second separably adhering unfused heat seal means 18 is transverse to second access passageway 14 intermediate the inner and outer ends thereof. Each of heat seals 17 and 18 is penetrated through access passageway outer ends 13b and 14b respectively.

Figure 2A:
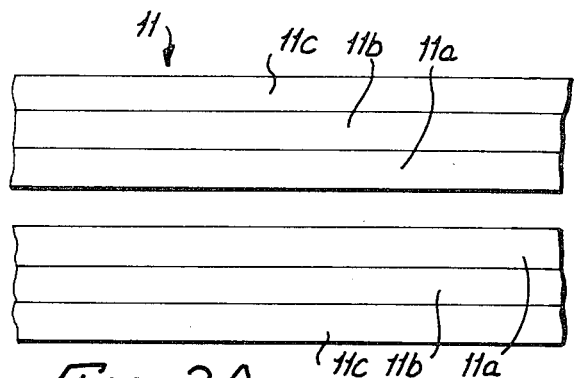
FIG. 2A is a plan view of two spaced sections of a three layer laminate suitable for fabrication of the FIG. 1 bag.
Figure 2B:
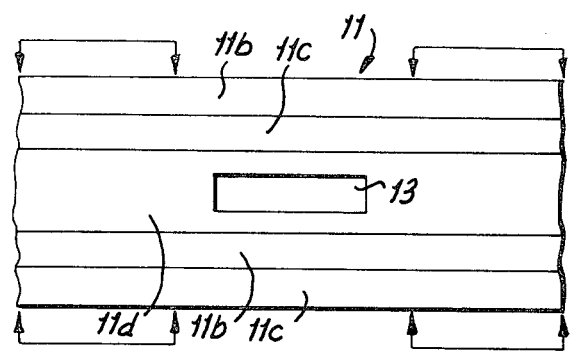
FIG. 2B is a plan view of the FIG. 2A laminates taken along line 2—2 of an end edge seal section 11 after formation of first access passageway 13.
Figure 2C:
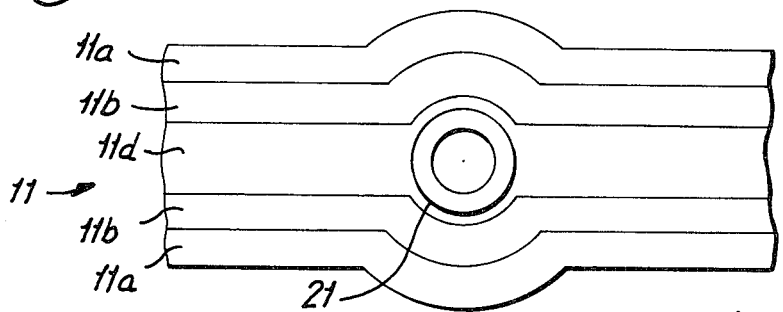
FIG. 2C shows the FIG. 2B plan view with biologically active material charging means 21 therein.

FIG. 2A, 2B and 2C show the end edge seal section 11 at three stages and comprises oppositely facing innermost layers 11a, middle layers 11b located outside of and bonded to the outer surface of innermost layers 11a, and outermost layers 11c located outside of and bonded to the outer surface of middle layer 11b. The inner surface of innermost layer 11a forms the inner wall of fluid storage compartment 10 and the outer surface of outermost layer 11c is exposed to the atmosphere. Referring now to FIG. 2A, the three layer laminates are shown spaced apart prior to heat bonding, and FIG. 2B shows the so-positioned laminates during (or after) the heat bonding step so as to form access passageways 13 and 14 respectively. Heat and pressure are applied to the extremities of the outermost layer 11c outer surface as illustrated by arrows, and the oppositely facing innermost layers 11a are fused together to form a molecularly integral structure 11d of about double the thickness of the adjacent innermost layers 11c in FIG. 2A. However, since heat and pressure are not applied to the center section of the outermost layer 11c outer surface, an unfused section is retained within each molecularly integral structure 11d thereby forming first and second access passageways 13 and 14. Passageways 13 and 14 are entirely transversely surrounded by the structure 11d and adaptable for outward transversely diverging displacement of the unfused inner wall of layers 11c by external longitudinal penetration through the outer end.

As used herein, the expressions "fused" and "fusion" mean heating a material or materials to sufficiently high temperature for fluid flow and formation of molecularly integral, permanent structures. By way of example, if innermost layer 11a is formed by medium density polyethylene and the same is heated to 175° C. under about 10 psig., such layers will be fused together. Also as used herein, the expression "unfused heat seal" means heating a material or materials to sufficiently high temperature only to form an impermeable but loosely associated temporary structure meant to be separable during use. By the way of example and again based on medium density polyethylene as innermost layer 11a, second separably adhering unfused heat seal means 17 and 18 may be formed by heating layer 11a to about 135° C. under about 10 psig.

As illustrated in FIGS. 2A and 2B, the fluid storage compartments 10 and access passageways 13 and 14 are substantially flat and two dimensional prior to fluid filling. However as illustrated in FIG. 2C, each passageway 13 and 14 is deformable by outward transversely diverging displacements to three dimensional configuration on insertion of biologically active material charging means (with respect to first passageway 13), biologically active material withdrawal means (with respect to second passageway 14), and storage of biologically active material (with respect to fluid storage compartment 10). The contour of passageway 13 and 14 is flexible and assumes the contour of the biologically active material charging and withdrawal means outer surface, and is contiguously associated therewith. Accordingly, a seal is formed between the surfaces and bacteriological contamination may be avoided.

The instant method for long term storage of biologically active material will now be described in connection with the thermoplastic bag of FIG. 1. The latter is heat sterilized before the biologically active material such as living cells are introduced. This may, for example, be done before the cryoprotective fluid is charged as for example by placing a sealed bag or group of sealed bags in a suitably heated chamber equipped with efficient air circulation apparatus, and maintaining a temperature for a period of time suitable to achieve sterilization. In the case of a bag containing no added cryoprotective fluid, time temperature regimens may be followed as for example described in the book "Disinfection, Sterilization and Preservation" (editors, C. A. Lawrence and S. S. Block; Publisher, Lea and Febiger, 1968). Suitable time-temperature regimens depend on the composition of the inner layer of the storage compartment, and representative values are shown below in Table A.

TABLE A

| Temperature | Time |
| --- | --- |
| 170° C (340° F) | 60 minutes |
| 160° C (320° F) | 120 minutes |
| 150° C (300° F) | 150 minutes |
| 140° C (285° F) | 140 minutes |
| 121° C (250° F) | overnight |

Should production or processing requirements call for minimal time allocations to the sterilization process, a small volume of pyrogen-free, distilled water, or of 0.9% saline solution, can be added to the bag at a concluding step in the fabrication procedure, a final heat sealing step being carried out immediately thereafter. The bags can then be placed in a steam autoclave in which temperature and pressure are independently controlled, and in which adequate circulation is maintained around the bags, and heated at 121° C. at 15 psi for 30–60 minutes. On termination of the sterilization operation, pressure within the autoclave chamber is maintained constant until the temperature is below the boiling point. Rupture due to excessive vapor pressure within the bags is thus prevented.

It will be evident if the bags are to be sterilized in the dry (empty) state that the sterilizing temperature selected must be compatible with thermal and structural stability of the layers of which the laminate bag is constructed. Thus a bag containing an inner layer of polyethylene would be unlikely to be stable about 140° C. while a suitably laminated inner layer of nylon could be.

Using this procedure, the cryoprotective fluid may be sterilized before charging into the bag by conventional autoclaving at 115° C. to 125° C. (10 to 20 psi) for 15 minutes to one hour as, for example, described in the book "Fundamentals of Bacteriology" by M. Frobisher, Jr. (Saunders, 1944) and in the book "Textbook of Bacteriology" by E. O. Jordan and W. Burrows, page 10 (Saunders, Philadelphia 1946).

Alternatively, heat sterilization may be performed after charging of the cryoprotective fluid into the bag by providing an opening 19 during fabrication in the edge seal section as for example at the corner as illustrated in FIG. 1. The cyroprotective fluid is introduced through opening 19 at a concluding step in the fabrication procedure, followed by a permanent fused heat seal 20 across the opening. The bag, now completely sealed, is placed in an autoclave (retort) in which independent control of temperature and pressure are preferably maintained and proper spacing of contents allows maximum heat transfer. Sterilization is then carried out at the required conditions of temperature and pressure (115° C. to 125° C. and 10 to 20 psi) for the prescribed period of time (15 minutes to one hour).

At the conclusion of the sterilization the chamber pressure is maintained constant and the temperature is lowered until the bag contents are well below the boiling point of water, at which point the chamber pressure can be lowered to atmospheric pressure. The cyroprotectant-filled bag is then ready for distribution and use.

Figure 3:
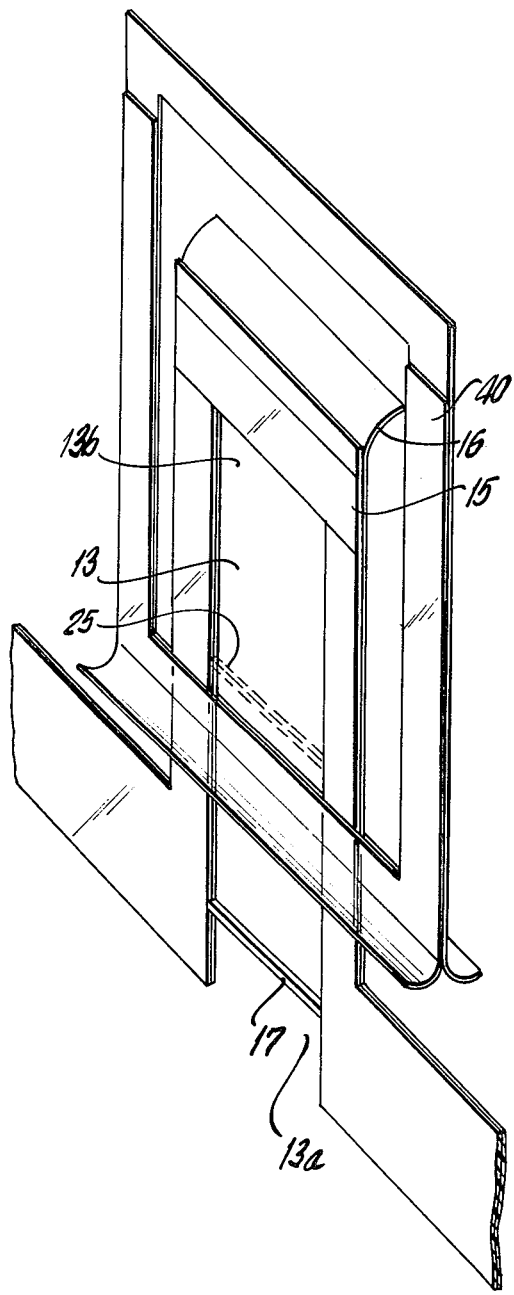
FIG. 3 is an enlarged isometric view of first passageway 13 with its outer end 13b enclosed by seal means 15 and pull tab means 16 enclosed by port cover means 40.

Referring now to FIG. 3, if port cover means 40 are superimposed over pull-tab means 16, the former is first separately removed from the means 16 enclosing the first passageway outer end 13b. Next pull tab means 16 is separated and with it separably adhering seal means 15 over first passageway outer end 13b thereby exposing passageway 13. After the permanently fused heat seal 25 (hereinafter discussed) has been made separable seal means 15 and pull tab means 16 will normally be discarded and not reused. It will be noted that second separably adhering unfused heat seal means 17 is located transverse to first passageway 13 near the inner end 13a, but means 17 has now been separated and no longer has a sealing function.

Figure 4:
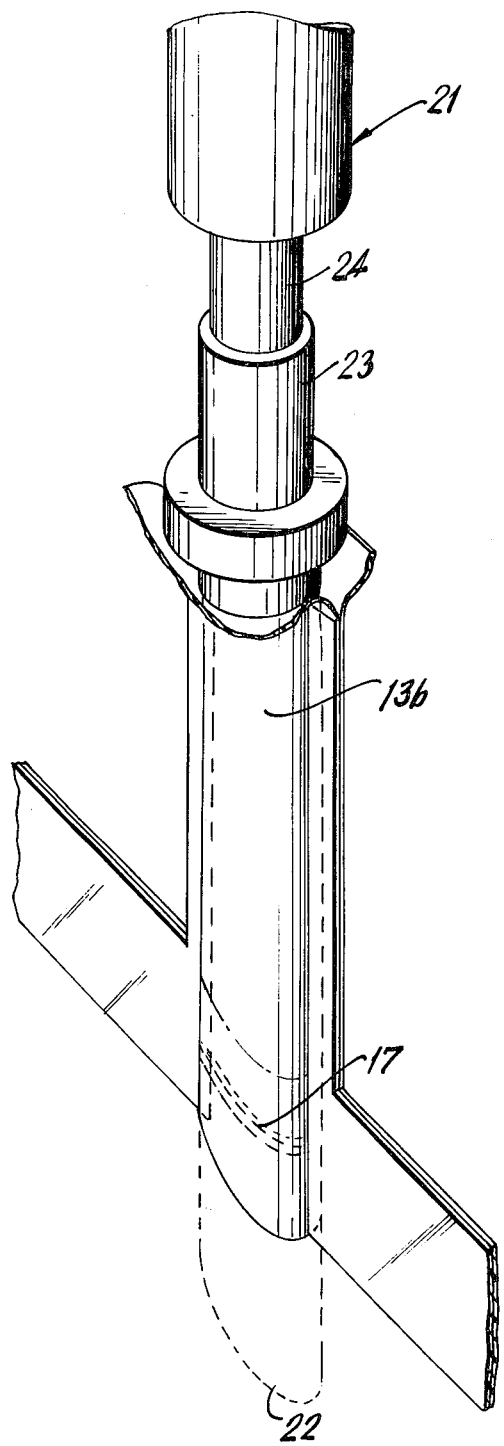
FIG. 4 is an enlarged isometric view of first passageway 13 with biologically active material charging means 21 therein.

Referring now to FIG. 4, biologically active material charging means 21 is aseptically inserted into the first passageway outer end 13b and second transverse heat seal 17 (see dotted line) is separated by inner tip 22 (indicated by dotted line). Suitable charging means are well known in the art and may include a sterile coupler 23; a hypodermic syringe 24 joined to the coupler 23, tubing joined to the coupler at one end and to a reservoir containing a desired volume of biologically active material at the other end. The latter is then delivered through the charging means, now inserted within the first passageway 13, into storage compartment 10. During delivery of the biologically active material, charging means 21 is maintained at a higher elevation than the bag so as to prevent back-flow into the first passageway 13.

On completion of biologically active material delivery, charging means 21 is partially withdrawn from first passageway 13 such that the inner tip 22 is positioned between separated heat seal 17 and the passageway outer end 13b. First passageway 13 is then transversely and permanently fusion heat sealed at location 25 to form third seal (see dotted lines in FIG. 3) between the partially withdrawn inner tip 21 and the passageway inner end 13a. The inner tip 22 is only partially withdrawn prior to heat sealing to prevent contamination of the biologically active material through first passageway 13. Charging means 21 is now removed from the heat-sealed first passageway 13 and normally discarded. At this point separated heat seal means 15 and pull tab means 16 may also be severed and discarded.

The sealed bag and the contained biologically active material are now ready for freezing as for example by liquid nitrogen refrigerant. This is accomplished in equipment designed for the purpose and according to a cooling-freezing program suitable for the particular stored biologically active material. The so-frozen biologically active material-containing bag is placed in storage refrigeration with a suitable inventory control system.

When the biologically active material is needed, the frozen bag is removed from the storage refrigerator and placed in a suitable thawing device for warmup. On completion the biologically active material may be removed from fluid storage compartment 10 through second passageway 14. The procedure for biologically active material removal is very similar to the aforedescribed and illustrated charging. In particular if port cover means 40 are superimposed over pull tab means 16, the former is first separately removed from the means 16 enclosing the second passageway outer end 14b. Next and using aseptic procedure, pull-tab means 16 are separated and with it removably adhering first seal means 15 over second passageway outer end 14b thereby exposing passageway 14.

Now biologically active material withdrawal means similar to biologically active material charging means 21 as illustrated in FIG. 4 is aseptically inserted into the second passageway outer end 14b and second separably adhering unfused heat seal 18 is penetrated by the inner tip thereof. Suitable withdrawal means are well-known in the art and may include a sterile coupler, tubing joined to the coupler outer end and also joined to a reservoir, and a clip over the tubing to control flow of biologically active material therethrough.

With the withdrawal means securely attached, the bag is inverted so that the biologically active material is above released seal 18. For convenience hole 26 may be provided in the edge seal opposite end, for suspension from a suitable support at desired height. The upper right corner of the bag may be folded over along dotted line 27, thereby creating a funnel shape assuring that the fluid contents of bag 10 are located over second passageway 14 for complete drainage. The clip over the discharge tubing is now released and the biologically active material released by gravity through withdrawal means now contained within second passageway 14.

When used for storage of living cells or other biologically active systems in the frozen state, the thermoplastic laminate forming the bag of this invention must have the following characteristics:

(1) It is heat sealable to itself at temperature above the sterilization temperature of the cryoprotectant solution, i.e. about 123° C.
(2) It is heat sterilizable, while maintaining structural integrity, at temperature of about 125° C. and 18–28 psi.
(3) It permits the transfer of heat over a wide range of rates and temperature gradients.
(4) It is structurally stable over the entire range of freezing, thawing, storing and sterilization temperatures, with all seals remaining intact under handling conditions likely to be encountered in blood banks following recommended processing procedures and under specified shipping methods in the frozen and unfrozen states. A suitable temperature range is −196° C. to +125° C.
(5) It is biologically inert to living and molecular systems in contact with its inner surfaces.
(6) It contains no adhesives or plasticizer which are leachable under conditions prescribed for use in the preservation of living cells or other biologically active systems.
(7) Its outer surface will accept marking for permanent identification of the contents over the temperature range of 4).

Unfortunately there is at present no single material of proven compatibility with living cells and other biologically active materials which has all of these characteristics, but they are provided by certain laminates.

The inner layer is the surface in direct contact with the biologically active material to be preserved, and in addition to the above listed properties, must be compatible with the biological integrity of material contained therein and must release into it no substance which is not known to be wholly innocuous to and wholly excretable by man or animals that may receive infusions of the preserved material. There are few materials at present which meet the last-mentioned requirement. One suitable material for use as the laminate inner layer is polyethylene in a homopolymeric middle density form. However, it is not heat sterilizable and tends to fragility at cryogenic temperatures. Another suitable inner layer material is polypropylene. In addition, it is possible that certain forms of nylons, polyester, and fluoroplastics may be suitable for use as the laminate inner layer.

If a two-layer laminate is used, the outer layer is preferrably transparent since the preferred inner layer polyethylene is also transparent. A suitable material from this standpoint and having acceptable stability at cryogenic temperature, and an acceptable degree of impermeability is polyethylene terephthalate (known commercially as "Mylar").

In the practice of this invention it may be desirable to employ a three-layer laminate with metal (including the oxide forms) as the middle layer as for example aluminum foil. This is because the metal appears to stabilize inner and outer plastic layers in tests at cryogenic temperatures. Only severe crushing and crumpling at cryogenic temperatures seem to induce cracking and pin hole leaks in such three-layer laminates. It should be noted however that the metal layer renders the laminate opaque so is less suitable for fabrication of a blood storage bag from which a transfusion is to be performed.

In the aforedescribed three-layer laminate, many materials are suitable for use as the outer layer. Among the especially desired properties are flexibility at low and high temperatures. Suitable materials include bioriented polypropylene, polyimide, polyamides and fluoroplastics.

A number of laminates were obtained in bag form and tested for low temperature stability, heat sterilizability and heat sealability. Each of the tested laminates proved to be satisfactory and could be used in the practice of this invention. These laminates and bonding materials were as follows:

No. 1 — 48 gauge (0.00048 inch thick) polyester as outer layer, urethane type adhesive, 0.00035 inch thick aluminum foil as middle layer, polyester type wash and urethane type adhesive, and 0.003 inch thick ethylene-propylene copolymer as inner layer.
No. 2 — Same as laminate No. 1 except inner layer was 0.001 inch thick ethylene-propylene polymer
No. 3 — Same as laminate No. 1 except inner layer was 0.001 inch thick polyethylene.

No. 4 — 48 gauge polyester as outer layer, urethane type adhesive, and 0.002 inch thick medium density polyethylene as inner layer.

No. 5 — 75 gauge (0.00075 inch) thick) bioriented polypropylene as outer layer, urethane type adhesive, 0.00035 inch thick aluminum foil as middle layer, urethane type adhesive, and 0.0015 inch thick polyethylene as inner layer.

No. 6 — 50 gauge (0.00050 inch thick) polyester as outer layer, polyurethane adhesive and 0.003 inch thick ethylene-isobutylene copolymer as the inner layer comprising 70-80% by weight high density polyethylene and 20-30% by weight polyisobutylene.

A series of tests were conducted to demonstrate the suitability of the aforedescribed laminates for storage of platelet-rich plasma. In these tests, aliquots of platelet-rich plasma were charged into bags formed by the laminate No. 3 and having configurations similar to FIG. 1. The bags were then heat sealed at the entry ports and incubated at 22° C. for 2 hours in a rotating shaker. The uptake rate of 5 hydroxytryptamine otherwise known as serotonin was then measured after storage times of 4 hours and 24 hours. The blood platelet uptake rate of serotonin is a well-known measure of platelet activity, as for example, described by G. V. F. Bow and R. E. Gillson in J. Physiology 146, 472, 1959. In brief, serotonin is a vaso-constricting agent and under conditions necessitating clot information (for example bleeding due to injury), the platelets release it at the site as one of the steps in the physiological process. Accordingly, measurement of serotonin uptake by blood platelets stored in bags is an indication of the bag's suitability for this function. Table B summarizes the aforedescribed tests, using a single layer polyvinylchloride (PVC) bag as representative of the prior art and two bags fabricated from laminate No. 3 (polyester-aluminum foil-polyethylene.)

TABLE B

| Bag Type | Storage Time, Hr. | Serotonin Uptake % |
| --- | --- | --- |
| PVC | 4 | 96.3 |
|  | 24 | 96.3 |
| Laminate No. 3 | 4 | 95.4 |
| (sample A) | 24 | 95.7 |
| Laminate No. 3 | 4 | 96.2 |
| (sample B) | 24 | 95.6 |

Table B tests show that from the standpoint of compatibility and avoidance of adverse effects, laminate No. 3 is as suitable as the commonly used polyvinylchloride for storage of blood platelets. Based on these tests, it is believed that any of the aforedescribed laminates are useful for fabrication of the thermoplastic bag of this invention.

In another series of tests, using the procedure described by Dayian and Rowe, Cryobiology 13, 1, 1976, platelet-rich blood plasma was delivered in two types of bags: the single layer bioriented polyethylene type in commercial use, and the thermoplastic bag of this invention fabricated from laminate No. 3 having configuration similar to FIG. 1. More particularly, the dimensions of the last-mentioned bag as identified in FIG. 1 were as follows:

A = 11.4 cm., B = 9.3 cm., C = 10.2 cm., D = 0.2 cm. when flat and 0.128 cm. diameter when extended.

The first and second access passageways were sealed in the aforedescribed manner and each bag was placed in a liquid nitrogen freezer. The cooldown and freezing sequence was as summarized in Table C.

TABLE C

| Step | |
| --- | --- |
| 1 (liquid state) | 30° C per minute |
| 2 (latent heat) | At - 7° C |
| 3 (warmer solid state) | 30° C per minute |
| 4 (cooler solid state) | At - 196° C |

After 24 to 72 hours storage, the frozen platelet rich blood plasma was thawed by placement in a water bath at 40° C. for 20 seconds. Reconstitution in platelet-free plasma was carried out at room temperature. Platelet counts were performed on the unfrozen samples and the two thawed-resuspended samples, and serotonin uptake values were determined with the results of Table D.

TABLE D

| Platelet Preparation | Bag Type | Platelet Count | Serotonin Uptake % |
| --- | --- | --- | --- |
| Unfrozen | none | $1.4 \times 10^{10}$ | 97.1 |
| Frozen & thawed | Bioriented Polyethylene | $6.41 \times 10^{11}$ | 55.3 |
| Frozen & thawed | Laminate No.4 | $6.87 \times 10^{11}$ | 65.2 |

A comparison of the Table D data reveals that the present invention was at least as satisfactory as present commercial practice in terms of platelet recovery (over 90%) and activity (serotonin uptake).

In the previously described embodiments of the bag of this invention, the bag was used for freezing and storage of living cells as the biologically active material. However the same bag may be used for other purposes, and in general for isolated storage of materials. Also, the bag may include two or more interconnected fluid storage sub-compartments as for example illustrated in FIG. 5.

Figure 5:
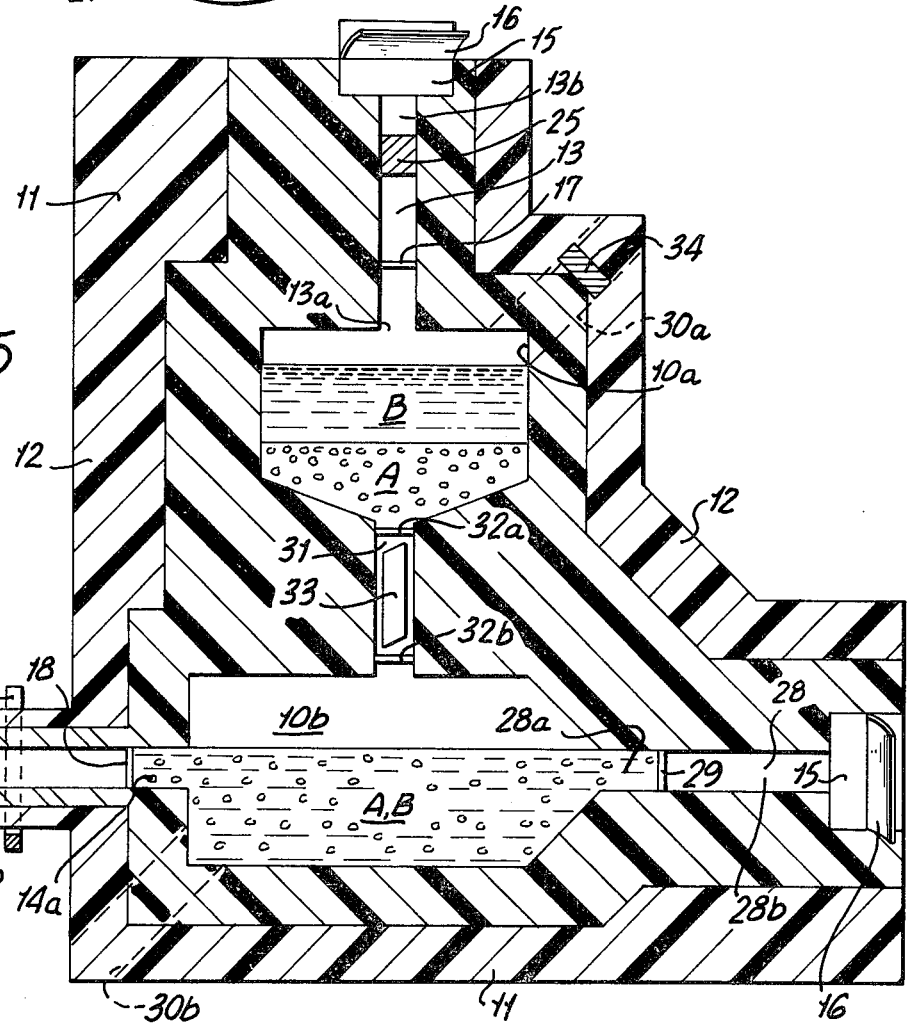
FIG. 5 is an elevation view taken in cross section of another thermoplastic bag of the invention having two innerconnected fluid storage sub-compartments.

Referring now to FIG. 5, first and second access passageways 13 and 14 are substantially identical to the FIG. 1 passageways having the same identification numbers, although second access passageway 14 is located in the side edge seal section 12 rather than end section 11. Third access passageway 28 extends through the opposite side edge seal section 12 and is substantially identical to first and second passageways 13 and 14, and second separably adhering unfused heat seal means 29 is transverse passageway 28 intermediate the inner and outer ends thereof. It will be noted that its pull-tab means 16 is flush with the edge of side seal section 12. For some end uses, maximum physical protection of the fluid chamber access passageway area is desirable. Dotted lines show apertures 30a and 30b which could be formed through the edge walls into first and second sub-compartments for example during the manufacturing process, for the introduction of fluid. In either case the aperture would then be transversly sealed, preferably permanently and by fusion.

First and second sub-compartments 10a and 10b are joined by restricted innerconnecting longitudinal passageway 31 transversly surrounded by side edge seal sections 12. As illustrated, separably adhering heat unfused seal means 32a and 32b are provided at opposite ends of passageway 31. A device 33 may be placed therein to permit penetration of seals 32a and 32b thereby allowing fluid flow between the sub-compartments. By way of illustration, such a device 33 might be formed of material having a melting point which would allow placement of a heat seal at this location after fluid has been transferred. Alternatively, fluid could be transferred between the sub-compartments by separating seals 32a and 32b with hydrostatic pressure applied with a roller or other device, without puncturing means.

A typical use of the FIG. 5 bag will now be described and it will be assumed that solution "A" has been introduced through access opening 30a thereby partially filling just sub-compartment 10a, followed by transverse heat sealing at location 34. If appropriate, the bag will have been heat sterilized with solution "A" therein, and may be handled in essentially two-dimensional flat form.

Solution "B" is now charged through first access passageway 13 into first sub-compartment 10a in the previously described manner, and passageway 13 is transversly fusion-heat sealed at location 25. Interaction between solutions A and B now proceeds under predetermined conditions in first sub-compartment 10a.

Using a roller to apply pressure to the fluid contents in first (upper) sub-compartment 10a with the bag lying flat on a table surface, pressure is applied toward the second (lower) sub-compartment 10b, separating the seals 32a and 32b. The solution A–B contents of the first (upper) sub-compartment 10a are transferred through passageway 31 to the second (lower) sub-compartment 10b and the passageway 31 may be transversely sealed as by heat or mechanically by a suitable chip punch. If desired, the upper part of bag may be severed along a line just above the newly made seal, and discarded.

The user may now separate pull-tab means 16 and first seal 15 over the outer end of second access passageway 14, and charging means (for example the FIG. 4 type) is inserted sufficiently far for its inner tip to separate second transverse heat seal 18. Then after proper orientation of the bag, a third solution "C" is fed through the charging means into second sub-compartment 10b for mixing with solution A-B. The charging means may now be withdrawn and second passageway 14 closed as for example by transverse placement of external clamp 35 thereacross, sealing the passageway reversibly so that it can be re-entered if desired.

Interaction of solution A–B and solution C proceeds in second sub-compartment 10b, and when complete (as for example determined by visual inspection if laminate 11 is transparent), the contents may be removed. The latter may be accomplished by use of the previously described material withdrawal means, inserted through either second passageway 14 or third passageway 28.

It will be apparent that the FIG. 5 bag has numerous end uses, as for example for educational purposes. A chemical reaction or multiple reactions could be formed and observed. Another possible use of the bag is for analytical purposes. That is, a test may be repeatedly carried out in a series of bags on a material obtained from a variety of different sources. An illustration is testing of different water supplies under conditions in which adequate laboratory facilities are unavailable. The following is an illustrative list of chemical interaction types and other uses for which the bag of this invention is especially suited to or (for):

(1) Interactions in which the escape of toxic gases is to be avoided.
(2) Procedures in which small quantities of radioactivity released during reactions are safely contained.
(3) Interactions involving corrosive damage to clothing or skin.
(4) Conditions under which physical changes and transitions are to be visually observed in closed systems.
(5) Procedures in which one set of interactions on a substance are to be separated in time from a second set.
(6) Procedures requiring closed systems subjected to a wide range of temperature.
(7) Procedures with one or more steps requiring storage in the frozen state.
(8) Procedures requiring precise control of heat input or heat removal for uniformity through the mass of material being preserved.

Although certain embodiments of this invention have been described in detail, it will be appreciated that other embodiments are contemplated along with modifications of the disclosed features, as being within the scope of the invention.

What is claimed is:

1. A sealed, flexible thermoplastic bag comprising: a fluid storage compartment enclosed by laminate edge seal sections; first and second access passageways each having an outer end joining walls integral with and extending through an edge seal with inner ends in fluid communication with said fluid storage compartment; first separably adhering unfused seal means transverse to the outer ends of each said first and second passageways and pull-tab means over each of such first seal means and associated therewith so as to open same on separation; second separably adhering unfused heat seal means transverse to each of said first and second passageways and intermediate said inner and outer ends, said fluid storage compartment and first and second access passageways each being substantially flat and two dimensional prior to fluid filling but deformable to three dimensional configuration, and formed by said laminate having at least two layers with the innermost layer being heat fusible to itself such that said edge seal sections comprise fused oppositely facing innermost layers with two unfused transversely spaced longitudinal sections each entirely transversely surrounded by the fused innermost layer and each adaptable for outward transversely diverging displacement of said innermost layer by external longitudinal penetration through said outer end so as to form said first and second access passageways.

2. A bag according to claim 1 wherein said laminate comprises three layers with the middle layer formed by metal.

3. A bag according to claim 2 wherein metal comprises said middle layer of said laminate.

4. A bag according to claim 1 wherein a biaxially oriented polyolefin selected from the group consisting of polyethylene and polypropylene comprises said innermost layer of said laminate.

5. A bag according to claim 1 wherein biaxially oriented polyethylene comprises said innermost layer and aluminum foil comprises said middle layer of said laminate.

6. A bag according to claim 1 with removable port cover means superimposed over and separately removable from each of said pull-tab means.

7. A bag according to claim 1 in which said laminate is heat sterilizable and structurally stable at temperature as low as $-196°$ C. with the innermost layer being heat fusible to itself at temperature about $127°$ C.

8. A bag according to claim 1 having sterile cryoprotectant solution therein and enclosed by said innermost layer.

9. A bag according to claim 1 wherein said fluid storage compartment comprises at least two sub-compartments, joined to each other by an innerconnecting passageway surrounded by said laminate and having a separably adhering unfused seal means transverse said innerconnecting passageway with said first access passageway joining a first sub-compartment, said second access passageway joining a second sub-compartment, and a third access passageway having an outer end joining a wall integral with and extending through an end edge seal with an inner end in fluid communication with one of said sub-compartments and being formed from an unfused longitudinal section in said edge seal entirely transversely surrounded by the fused innermost layers and adaptable for outward transversely diverging displacement of said innermost layers by external longitudinal penetration through said outer end; first separably adhering unfused seal means transverse the third passageway outer end and pull tab means over said first separably adhering seal means and associated therewith so as to open same on separation; and second separably adhering unfused heat seal means transverse to said third passageway and intermediate said inner and outer ends.

10. A package comprising: a sealed, flexible thermoplastic bag having a fluid storage compartment enclosed by laminate edge seal sections; first and second access passageways each havng an outer end forming walls integral with and extending through an end edge seal with inner ends in fluid communication with said fluid storage compartment; first separably adhering unfused seal means transverse the outer end of said second passageway and pull-tab means over said first separably adhering seal means and associated therewith so as to open same on separation; second separably adhering unfused heat seal means transverse said second passageway and intermediate said inner and outer ends; third permanently fused heat seal means transverse to said first passageway intermediate said inner and outer ends; said fluid storage compartment and first and second access passageways each being substantially flat and two dimensional prior to fluid filling but deformable to three-dimensional configuration, and formed by said laminate having at least two layers with the innermost layer being heat fusible to itself such that said edge seal sections are formed by fused oppositely facing innermost layers with two unfused transversely spaced longitudinal sections each entirely transversely surrounded by the fused innermost layers and adaptable for outward transversely diverging displacement of said innermost layers by external penetration through said outer end so as to form said first and second access passageways; and biologically active material stored within said bag and enclosed by said innermost layer.

11. A package according to claim 10 in which said laminate is heat sterilizable and structurally stable at temperature as low as $-196°$ C. with the innermost layer being heat fusible to itself at temperature about $127°$ C.

12. A package according to claim 11 in which said laminate comprises three layers with the middle layer formed by metal.

13. A package according to claim 11 in which said biologically active material comprises living cells suspended in cryoprotectant solution.

14. A package according to claim 13 wherein blood platelets comprise said living cells.

* * * * *